Nov. 27, 1928.
H. S. JANDUS
1,693,513
BUMPER CLAMP
Filed July 18, 1927
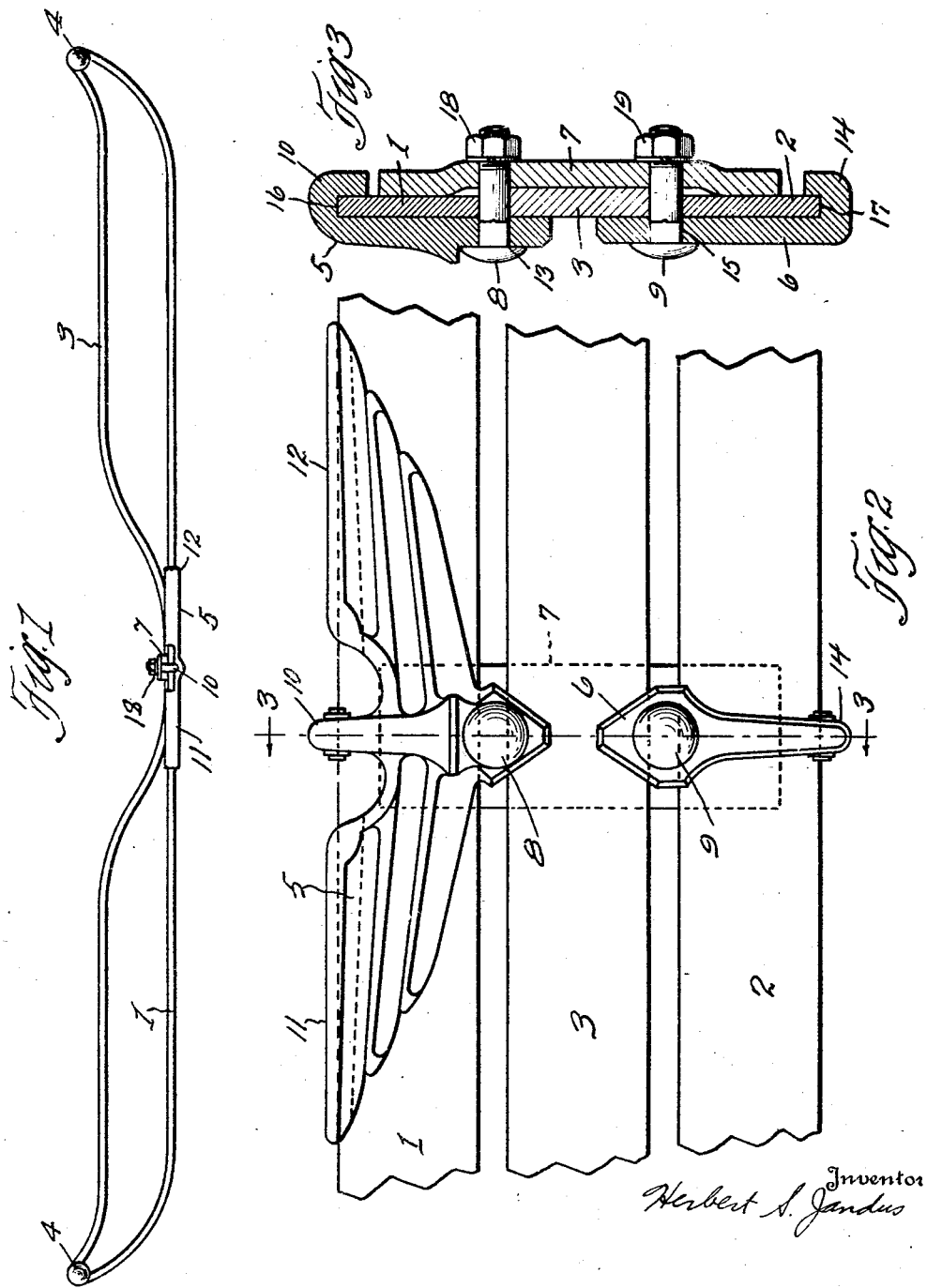

Patented Nov. 27, 1928.

1,693,513

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

BUMPER CLAMP.

Application filed July 18, 1927. Serial No. 206,435.

This invention relates to a clamp for holding the bars of a vehicle bumper. An object of the invention is to provide a clamp which will hold the several bars in their proper places and thereby prevent them from rattling. A further object is to provide a clamp which may be readily applied to the bars of the bumper and which will insure a rigid connection between the several bars. A further object is to produce such a clamp which will at the same time present an attractive ornamental appearance in conjunction with the remainder of the bumper. Other objects will be apparent from the description and drawings and from the use of the articles covered by the claims.

In the drawing Fig. 1 represents a plan view of a vehicle bumper with my clamp attached thereto; Fig. 2 represents a fractional front elevation of the central portion of the bumper showing the center clamp in detail; Fig. 3 represents a sectional view taken on the line 3—3 of Fig. 2.

In the following description and claims I will assume the bumper to be attached to the front of a vehicle and the terms "front" and "rear" will be used in view of this assumption but in so doing it is not intended to restrict the use of my clamp to any particular position relative to the bumper.

Of the reference characters shown in the several figures, 1 and 2 denote the impact bars of a bumper of the type shown in Patent No. 1,372,154, issued March 22, 1921, to Allan L. McGregor. The rear bar 3 of this bumper is pivotally connected at its ends to the ends of the impact bars by means of the pins 4, 4 and it projects forwardly at its central portion for connection to, and between, the vertically spaced impact bars.

My clamp, which is here shown as adapted to connect the several bars at the center of the bumper, consists of front plates 5 and 6, a rear plate 7 and bolts 8 and 9 for drawing the front and rear plates toward each other.

The front plate 5 has, at the central portion of its upper edge, a rearwardly and then downwardly projecting portion 10 adapted to enclose a portion of the upper edge of the impact bar 1 and so prevent a forward displacement of this portion of the clamp plate. The upper edge of the plate 5 is also provided with projecting portions 11 and 12 adapted to bear upon the upper edge and rear surface of the impact bar 1 and to give an extended bearing thereupon. This plate also has an aperture 13 for the reception of the bolt 8 passing therethrough.

The front plate 6 may be of similar construction to that of plate 5 but it is here shown as providing a rearwardly and then upwardly projecting portion adapted to fit around the lower edge of the impact bar 2 and an aperture 15 to receive the stem of the bolt 9 passing therethrough. The rear plate 7 is bent forwardly at its end portions and so adapted to bear upon the rear surfaces of the impact bars 1 and 2 and the rear bar 3. It is apparent that more than one suitably shaped plate could be substituted for the single rear clamp plate 7.

In assembling my clamp the plate 5 is positioned so that the upper edge of the impact bar fits within the recesses indicated at 16 and formed between the plate 5 and the rearwardly projecting portions 10, 11 and 12. The rear plate 7 is placed so that the aperture therein provided for the bolt 8 registers with the aperture 13. The bolt 8 is then passed through these apertures in the front and rear plates and between the bars 1 and 3. The plate 6 is positioned so that the edge of the impact bar 2 fits into the recess 17 and the bolt 9 is passed through the aligned apertures in the plates 6 and 7 and between the impact bar 2 and the rear bar 3. By tightening the nuts 18 and 19 the front and rear plates are drawn together and so hold the several bars in their proper spaced relation. The edges of the bars 1 and 3 may bear upon the stem of the bolt 8 and the edges of the bars 2 and 3 may bear upon the stem of the bolt 9 so that relative vertical movement of these bars at these points is prevented. An extended bearing provided by the projections 11 and 12 prevents the turning of the front plate 5 and the projections 10 and 14 prevent the forward displacement of the edges of the front plates.

It is not essential to my invention that the rearwardly projecting portions 10, 11, 12 and 14 should each extend downwardly or upwardly to form the recesses 16 and 17 and bear upon the rear surfaces of the impact bars 1 and 2, and it is apparent that any of these portions may be omitted in the use of my clamp. If the impact bars 1 and 2 are vertically or horizontally offset at the point of attachment of the clamp the plates 5 and 6 should be suitably shaped to give the desired bearing surface upon the edges of the said bars.

It is apparent that my clamp may be used on a different type of bumper and that it may be placed at a different position upon the bumper where it is desired to rigidly connect several bars. It is not intended to hereby restrict the use of my clamp to the particular application described.

Having thus described my invention, what I claim is:—

1. The combination with a pair of vertically spaced impact bars and a reinforcing bar bent forwardly for connection therebetween, of clamping means for holding said bars in proper spaced relation, said clamping means including a plate adapted to bear upon the front surfaces of the reinforcing bar and one of the impact bars, said plate having upon its upper edge spaced projections adapted to provide an extended bearing upon the upper edge of the impact bar and surfaces adapted to bear upon the rear of the same and an intermediate projecting portion adapted to extend beyond and behind the impact bar to provide a recess for the reception of the upper edge of the same, a plate adapted to bear upon the front surfaces of the reinforcing bar and the other impact bar, said last mentioned plate having at its lower edge a projecting portion adapted to extend beyond and behind, and so provide a recess for the reception of the lower edge of the said last mentioned impact bar, a plate adapted to bear upon the rear surfaces of the impact and reinforcing bars and means adapted to pass between the impact and reinforcing bars and through the several plates for drawing the said front and rear plates toward each other.

2. The combination with a pair of vertically spaced bumper bars and an auxiliary bar adapted to be connected therebetween, of means for clamping said bars to each other, said clamping means including a plate adapted to bear upon the front surfaces of the auxiliary bar and one of the bumper bars, said plate providing an extended bearing upon, and a recess for the reception of, an edge of said bumper bar, a second plate adapted to bear upon the front surfaces of the auxiliary bar and the other bumper bar, said last mentioned plate providing a recess for the reception of an edge of the last mentioned bumper bar, a plate adapted to bear upon the rear surface of the auxiliary bar and means passing between the bars for drawing the front and rear plates toward each other.

3. The combination with a pair of vertically spaced bumper bars and an auxiliary bar adapted to be connected thereto, of means for clamping said bars together, said means including a plate adapted to bear upon the front surfaces of the auxiliary bar and one of the bumper bars, said plate providing a recess for the reception of an edge of said bumper bar, a plate adapted to bear upon the front surfaces of the said auxiliary bar and the other aforementioned bumper bar, said last mentioned plate providing a recess for the reception of an edge of the last mentioned bumper bar, means for preventing the rearward movement of the bars relative to the plates, and means passing between the bars for drawing the last mentioned means and the front plates toward each other.

4. The combination with a pair of vertically spaced bumper bars and an auxiliary bar adapted to be connected thereto, of means for clamping said bars together, said clamping means including a plate adapted to bear upon the front surfaces of the auxiliary bar and one of the bumper bars, said plate providing a recess for the reception of an edge of said bumper bar, a second plate adapted to bear upon the front surfaces of the auxiliary bar and the other aforementioned bumper bar, said last mentioned plate providing a recess for the reception of an edge of the last mentioned bumper bar, means for preventing rearward movement of the several bars relative to each other, and means for drawing the said plates toward the last mentioned means.

5. The combination with a pair of vertically spaced bumper bars and an intermediate bar adapted to be held between said spaced bars, of means for clamping said bars together, said means including a plate adapted to bear upon the front surface of one of said bars and upon that of the intermediate bar, said plate providing an extended bearing surface upon an edge of said bumper bar, a second plate adapted to bear upon the front surface of the other spaced bumper bar and that of the intermediate bar, said last mentioned plate providing a recess for the reception of an edge of said last mentioned bar, a plate adapted to bear upon rear surfaces of the bars, and means for drawing the front and rear plates toward each other.

6. The combination with a pair of vertically spaced bumper bars and an intermediate bar adapted to be held between said bars, of means for clamping said bars together, said means including a plate adapted to bear upon the front surface of one of said bars and upon that of the intermediate bar, said plate providing an extended bearing surface upon, and a recess for the reception of, an edge of said bumper bar, a second plate adapted to bear upon the front surface of the other spaced bar and that of the intermediate bar, a plate adapted to bear upon rear surfaces of the bars, and means for drawing said front and rear plates toward each other.

7. The combination with vertically spaced bumper bars, of means for clamping said bars in proper spaced relation, said means including a plate adapted to bear upon the front surface of one of said bars, said plate providing an extended bearing surface upon an edge of said bar and a recess for the reception of an edge of said bar, a second plate adapted to bear upon the front surface of the other of said spaced bars and providing a recess for the reception of an edge of said bar, a plate adapted to bear upon the rear surfaces of the said bars, and means for drawing said front and rear plates toward each other.

8. The combination with vertically spaced impact bars, of means for clamping said bars in proper spaced relation, said means including a plate adapted to bear upon the front surface of one of said bars, said plate providing a recess for the reception of an edge of said bar, a second plate adapted to bear upon the front surface of the other bar and providing a recess for the reception of an edge of said last mentioned bar, a plate adapted to bear upon the rear surfaces of the bars and means for drawing said plates toward each other.

9. The combination with a pair of vertically spaced bumper bars, of means for holding said bars in proper spaced relation, said means including a plate adapted to bear upon the front surface of one of said bars and providing extended spaced bearing surfaces adapted to bear upon an edge of said bar, a second plate adapted to bear upon the front surface of the other bar and providing a recess for the reception of an edge of said last mentioned bar, a plate adapted to bear upon the rear surface of one of said bars, and means for drawing the front and rear plates toward each other.

10. The combination with vertically spaced bumper bars, of means for holding said bars in proper spaced relation, said means including a plate adapted to bear upon the front surfaces of the said bars, said plate providing spaced bearing surfaces adapted to bear upon an edge of one of said bars and a recess for the reception of an edge of one of said bars, a plate adapted to bear upon the rear surface of one of said bars and means for drawing said plates toward each other.

11. A clamp for connecting vertically spaced bars, said clamp including a plate adapted to bear upon the front surfaces of the bars, said plate providing spaced bearing surfaces upon, and a recess for the reception of, an edge of one of said bars, a plate adapted to bear upon the rear surface of one of said bars, means extending between the bars and through the plates for drawing said plates toward each other.

12. A clamp plate having a substantially horizontally projecting portion adapted to provide an extended bearing upon an edge of one of said bars, a recessed portion adapted to receive a portion of an edge of the bar, and an aperture adapted to receive the shank of a bolt.

13. The combination with a pair of vertically spaced impact bars and an auxiliary bar connected thereto, of a plate adapted to bear upon the front surfaces of one of said impact bars and the auxiliary bar, said plate having spaced surfaces adapted to bear upon an edge of said impact bar and a recess intermediate said bearing surfaces adapted to receive an edge of said impact bar, a second plate adapted to bear upon the other impact bar and upon the auxiliary bar and having a recess adapted to receive an edge of said second impact bar, a rear plate adapted to bear upon the rear surface of one of said bars and means for drawing said plates toward each other.

14. The combintion with a pair of vertically spaced impact bars and an auxiliary bar connected thereto, of a plate adapted to bear upon the front surfaces of one of said impact bars and the auxiliary bar, said plate having spaced recesses adapted to bear upon an edge of said impact bar and a recess between said spaced recesses adapted to receive an edge of said impact bar, a second plate adapted to bear upon the other impact bar and the auxiliary bar and having a recess adapted to receive an edge of said second impact bar, a rear plate adapted to bear upon the rear surface of one of said bars and means for drawing said plates toward each other.

15. A clamp comprising a plate adapted to bear upon the front surface of a bar, said plate having spaced surfaces adapted to bear upon an edge of said bar and a recessed projection intermediate said bearing surfaces adapted to receive an edge of said bar, a plate adapted to bear upon the rear surface of said bar and means for drawing said plates toward each other.

16. A clamp comprising a plate adapted to bear upon the front surface of a bar, said plate having spaced recesses adapted to receive an edge of said bar and provide bearing surfaces thereon and a recessed projection intermediate said spaced recesses adapted to receive an edge of the bar, a rear plate adapted to bear upon the rear surface of said bar and means for drawing said plates toward each other.

17. A clamp plate having spaced surfaces adapted to provide extended bearing surfaces upon an edge of a bar, a recessed projection intermediate said spaced bearing surfaces adapted to receive an edge of said bar and an aperture in said plate adapted to receive the shank of a bolt.

18. A clamp plate having spaced recesses adapted to receive an edge of a bar and to provide extended bearing surfaces thereon, a recessed projection intermediate said spaced recesses adapted to receive an edge of the bar and an aperture in said plate adapted to receive the shank of a bolt.

In testimony whereof, I hereunto affix my signature.

HERBERT S. JANDUS.